(12) United States Patent
Zuo et al.

(10) Patent No.: US 7,647,079 B2
(45) Date of Patent: Jan. 12, 2010

(54) BATTERY COVER LATCHING ASSEMBLY FOR PORTABLE ELECTRONIC DEVICE

(75) Inventors: Zhou-Quan Zuo, Shenzhen (CN); Chia-Hua Chen, Tu-Cheng (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 470 days.

(21) Appl. No.: 11/411,653

(22) Filed: Apr. 26, 2006

(65) Prior Publication Data

US 2007/0003827 A1    Jan. 4, 2007

(30) Foreign Application Priority Data

Jul. 1, 2005    (CN) .................. 2005 1 0035754

(51) Int. Cl.
*H04M 1/00* (2006.01)
(52) U.S. Cl. ................. 455/575.1; 455/550.1; 455/90.3; 455/575.8
(58) Field of Classification Search ............. 455/575.1, 455/550.1, 90.3, 575.8
See application file for complete search history.

(56) References Cited

U.S. PATENT DOCUMENTS

| | | | | |
|---|---|---|---|---|
| 5,955,700 A | | 9/1999 | Slipy et al. | |
| 6,380,899 B1 * | | 4/2002 | Madsen et al. | 343/702 |
| 6,463,263 B1 * | | 10/2002 | Feilner et al. | 455/90.1 |
| 6,525,928 B1 * | | 2/2003 | Madsen et al. | 361/683 |
| 7,416,805 B2 * | | 8/2008 | Nakamura et al. | 429/34 |
| 2002/0131584 A1 | | 9/2002 | Mote et al. | |
| 2004/0101356 A1 * | | 5/2004 | Cheng | 403/353 |
| 2004/0169044 A1 * | | 9/2004 | Chen et al. | 220/836 |
| 2005/0130721 A1 * | | 6/2005 | Gartrell | 455/575.8 |
| 2005/0136995 A1 * | | 6/2005 | Robertson, Jr. | 455/575.1 |
| 2007/0093140 A1 * | | 4/2007 | Begic et al. | 439/676 |

* cited by examiner

*Primary Examiner*—Joseph H Feild
*Assistant Examiner*—Huy D Nguyen
(74) *Attorney, Agent, or Firm*—Steven M. Reiss

(57) ABSTRACT

A battery cover latching assembly (50) is for a portable electronic device (100) including a housing (20), a first cover (10) configured for attaching to a first side of the housing, and a second cover (30) configured for attaching to a second side of the housing. The battery cover latching assembly includes a locking portion (131) and a latch (342). The locking portion is formed on the first cover. The latch is formed on the second cover. The latch includes a body (343) and a button portion (344) extending from the body. The body is engageable with the locking portion so as to lock the first cover and second cover with each other. The button portion is configured so as to be retained by the housing, and is operable to deform the body of the latch so as to unlock the first cover and the second cover.

12 Claims, 4 Drawing Sheets

BATTERY COVER LATCHING ASSEMBLY FOR PORTABLE ELECTRONIC DEVICE

CROSS-REFERENCE TO RELATED APPLICATION

The present application is related to the commonly-assigned U.S. patent application Ser. No. 11/377,790, entitled "BATTERY COVER LATCHING ASSEMBLY FOR PORTABLE ELECTRONIC DEVICE," filed on Mar. 16, 2006 with the same inventors, the contents of which are hereby incorporated by reference thereto.

BACKGROUND

1. Technical Field

The present invention generally relates to cover latching assemblies and, more particularly, to a battery cover latching assembly for use in a portable electronic device.

2. Discussion of the Related Art

Batteries are widely used in portable electronic devices, such as personal digital assistants (PDAs), mobile phones, and so on. Typical batteries are attachably received in the electronic device, and battery covers are designed to connect with housings of the electronic devices to package the batteries. The batteries have to be replaced by opening the battery covers when, for example, the batteries are damaged or dead (i.e. no longer rechargeable).

A clasp structure or latch structure is used with a typical battery cover to engage with a housing of a portable electronic device. For example, the Alcatel OT310 mobile phone has a latch for the battery cover. The latch includes a pair of hooks at one end of the battery cover and a locking pin protruding from the other end of the battery cover. Accordingly, a pair of grooves are defined in an end portion of a backside of a housing of the mobile phone, and a locking hole is defined in the other end portion of the backside of the housing. In assembly, the hooks are inserted into the grooves in the backside of the housing. Then, the battery cover is pressed downwardly to the housing until the locking pin on the battery cover is inserted into the locking hole in the backside of the housing. The battery cover is thus assembled to the housing of the mobile phone. The battery cover is simple in structure, and the engagement between the battery cover and the housing of the mobile phone is firm. However, during disassembly, a relative great effort is needed to disassemble the battery cover, since a substantial force is exerted thereon. The battery cover can easily be damaged during such disassembly. As a result, it is difficult for a user to replace a battery in the housing of the mobile phone.

Therefore, a new battery cover latching assembly is desired in order to overcome the above-described shortcomings.

SUMMARY

In one embodiment thereof, a battery cover latching assembly is for a portable electronic device including a housing, a first cover configured for attaching to a first side of the housing, and a second cover configured for attaching to a second side of the housing. The battery cover latching assembly includes a locking portion and a latch. The locking portion is formed on the first cover. The latch is formed on the second cover. The latch includes a body and a button portion extending from the body. The body is engageable with the locking portion so as to lock the first cover and second cover with each other. The button portion is configured so as to be retained by the housing, and is operable to deform the body of the latch so as to unlock the first cover and the second cover.

Other novel features will become more apparent from the following detailed description, when taken in conjunction with the accompanying drawings.

BRIEF DESCRIPTION OF THE DRAWINGS

Many aspects of the battery cover latching assembly can be better understood with reference to the following drawings. The components in the drawings are not necessarily drawn to scale, the emphasis instead being placed upon clearly illustrating the principles of the present battery cover latching assembly. Moreover, in the drawings, like reference numerals designate corresponding parts throughout the several views.

DETAILED DESCRIPTION OF THE EMBODIMENTS

The present battery cover latching assembly is suitable for portable electronic devices, such as mobile phones, PDAs, and so on.

Figure 1:
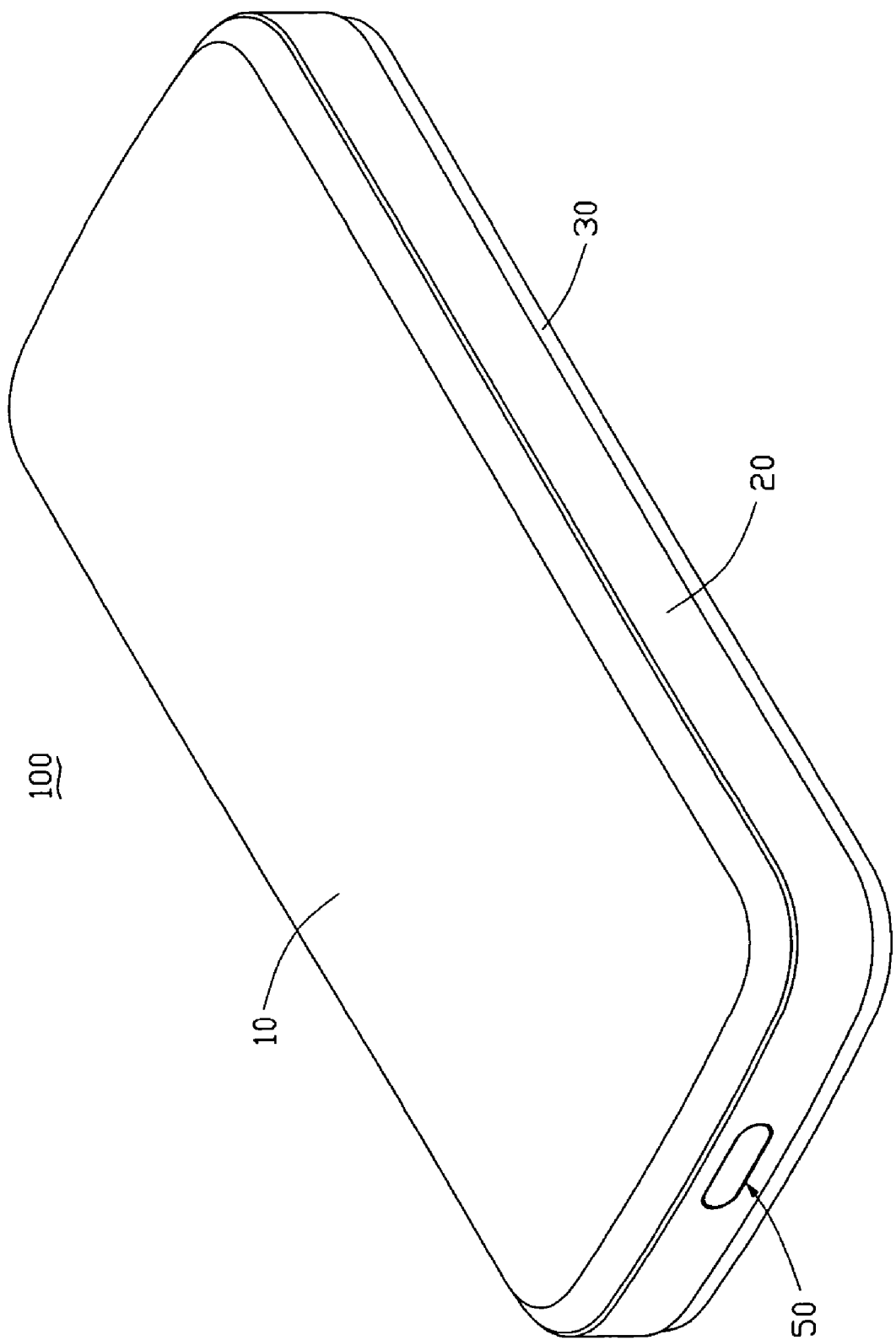
FIG. 1 is an assembled, isometric view of a mobile phone incorporating a battery cover latching assembly in accordance with a preferred embodiment.

Referring now to the drawings in detail, FIG. 1 shows a battery cover latching assembly 50 incorporated in a mobile phone/portable electronic device 100. The mobile phone 100 is taken here as an exemplary application, for the purposes of describing details of the battery cover latching assembly 50 of the preferred embodiment. The mobile phone 100 includes a battery cover 10, a housing 20 and a front cover 30, all of which are connected via the battery cover latching assembly 50. Also referring to FIG. 2 and FIG. 3, the battery cover latching assembly 50 includes a locking portion 131, a button hole 221, a through hole 242, and a latch 342. The locking portion 131 is defined in the battery cover 10. The button hole 221 and the through hole 242 are defined in the housing 20. The latch 342 is formed on the front cover 30. The battery cover latching assembly 50 is mounted in the housing 20 and releasably locks the battery cover 10, thereby interconnecting the housing 20 and the battery cover 10.

Figure 2:
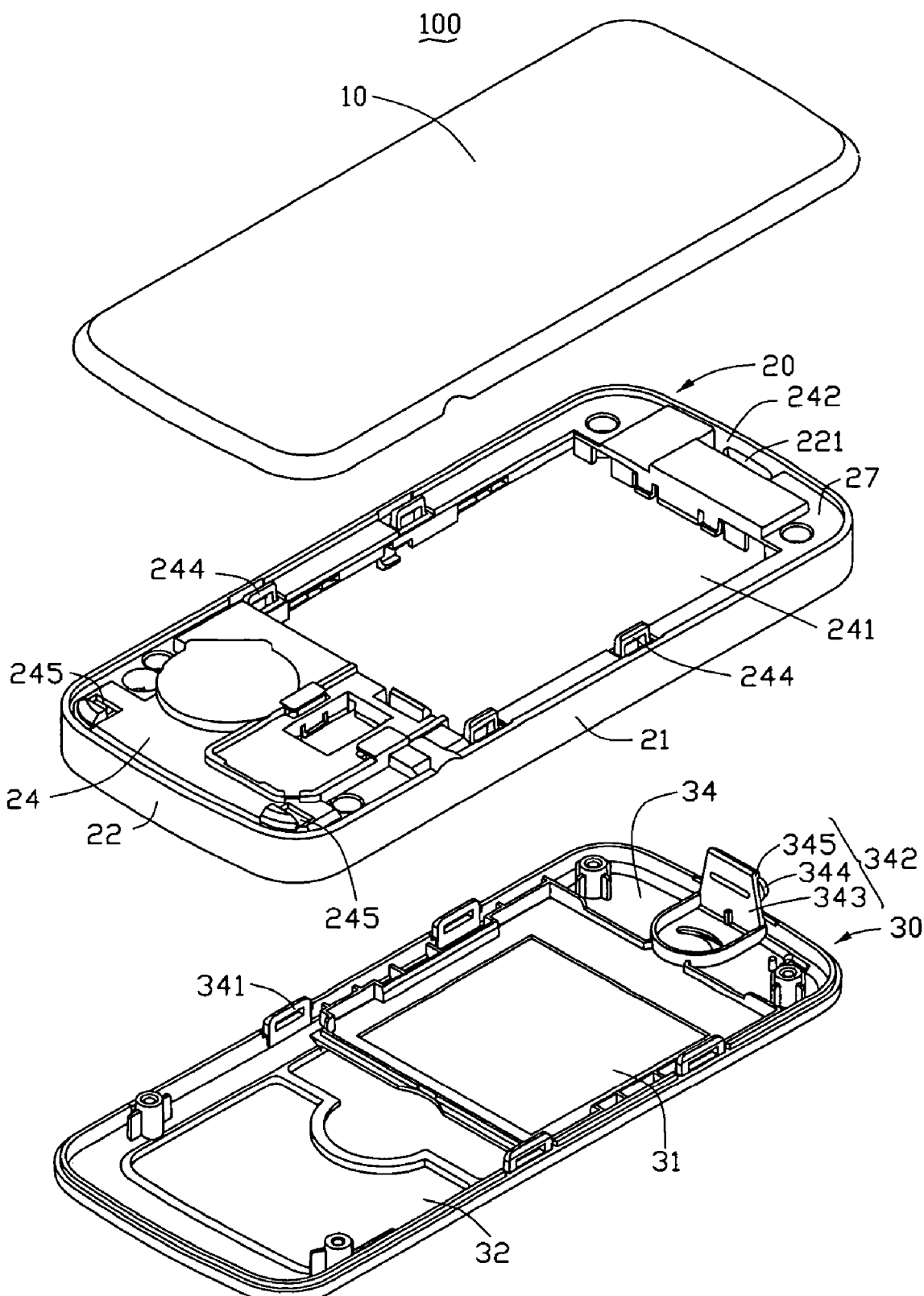
FIG. 2 is a reduced, exploded, isometric view of the mobile phone shown in FIG. 1.
Figure 3:
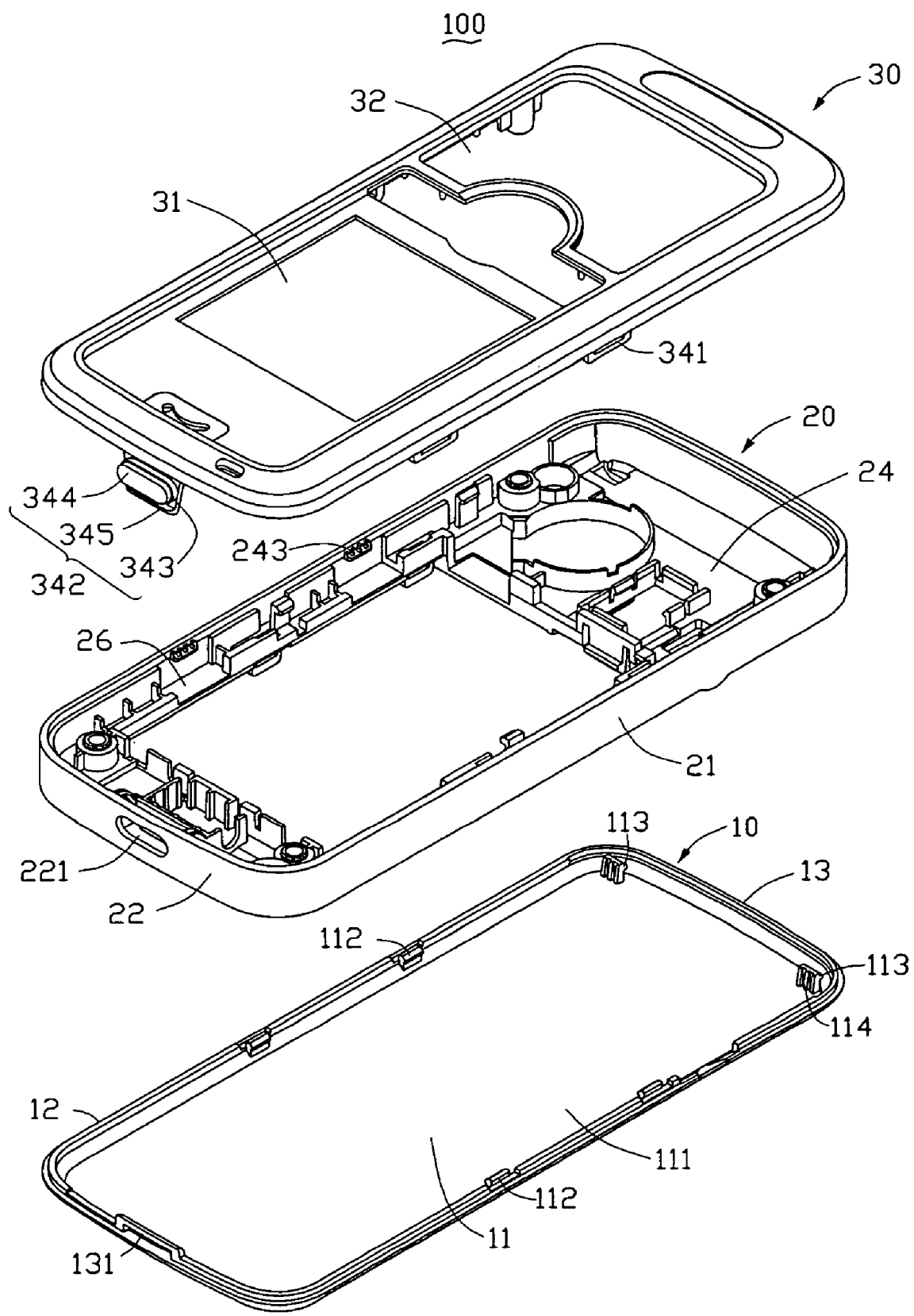
FIG. 3 is similar to FIG. 2, but viewed from another aspect.

Further referring to FIG. 2 and FIG. 3, the battery cover 10 includes a main body 11, two opposite long sides 12 and two opposite short sides 13. The main body 11 is a substantially rectangular sheet, which together with the long sides 12 and the short sides 13 defines a substantial rectangular space (not labeled) for engaging with the housing 20. The main body 11 has an inner surface 111. A pair of symmetrical first claws 112 are disposed on the inner surface 111 of the main body 11 adjacent to each long side 12. One end of each first claw 112 is connected with the inner surface 111, and the other end of each first claw 112 is hooked. A pair of symmetrical second claws 113 are disposed on the inner surface 111 of the main body 11, and adjacent to one short side 13. One end of each second claw 113 is connected with the inner surface 111, and the other end of each second claw 113 is hooked. In order to improve connection strength between the second claw 113 and the inner surface 111 of the main body 11, each second claw 113 further includes a plurality of tabs 114 formed on one surface thereof. The locking portion 131 is defined in the other short side 13 of the battery cover 10.

The housing 20 is a substantial rectangular space, which has two opposite sidewalls 21 and two opposite end walls 22. The housing 20 includes a main partition wall 24, and the partition wall 24 separates a first compartment 26 from an opposite second compartment 27. The first compartment 26 is advantageously configured for accommodating an electronic device (not shown), such as a printed circuit board, therein. This accommodation occurs when the housing 20 is assembled with other housings (for example front cover 30) of the mobile phone 100. The second compartment 27 is used to engagingly receive the battery cover 10. A recess 241 is defined in a middle portion of the partition wall 24. The recess 241 is used to receive a battery (not shown). The through hole 242 is defined in the partition wall 24 adjacent to one end wall 22 of the housing 20. The button hole 221 is defined in the end wall 22, and is in communication with the through hole 242. At the first compartment 26, a pair of symmetrical clasps 243 are disposed on an inner surface of each sidewall 21. Two pairs of symmetrical claw portions 244 are formed at opposing sides of the second compartment 27 on the partition wall 24 adjacent to the sidewalls 21. The claw portions 244 each engage with their corresponding first claws 112. A pair of symmetrical limiting portions 245 are formed on the partition wall 24, and adjacent to the other end wall 22 separate from the button hole 221. The limiting portions 245 are each engaged with their corresponding second claws 113 of the battery cover 10.

The front cover 30 is a substantial rectangular sheet, and includes two opposite long sides (not labeled) and two opposite short sides (not labeled). The front cover 30 includes a display containing portion 31 used to contain a display (not shown), and a keyboard containing portion 32 used to contain a keyboard (not shown). A pair of symmetrical clasp portions 341 are formed on an inner surface 34 adjacent to each long side of the front cover 30. The clasp portions 341 are each engaged with their corresponding clasps 243. The latch 342 is disposed on the inner surface 34, and adjacent to one short side of the front cover 30. The latch 342 is made of elastic material. The latch 342 includes a body 343 and a button portion 344 functioning as an operation portion perpendicularly extending from a middle of the body 343. One end of the body 343 is connected with the inner surface 34, and a hook 345 facing out of the front cover 30 is formed at the other end of the body 343. The hook 345 is releasably engaged with the locking portion 131 of the battery cover 10. The shape of the button portion 344 corresponds to the button hole 221 of the housing 20. A surface area of the button portion 344 is slightly smaller than that of the button hole 221 of the housing 20, thus the button portion 344 can be received in the button hole 221 of the housing 20. The button portion 344 could be integrated with the body 343 or attached to the body 343 by using, for example, a glue/adhesive.

Figure 4:
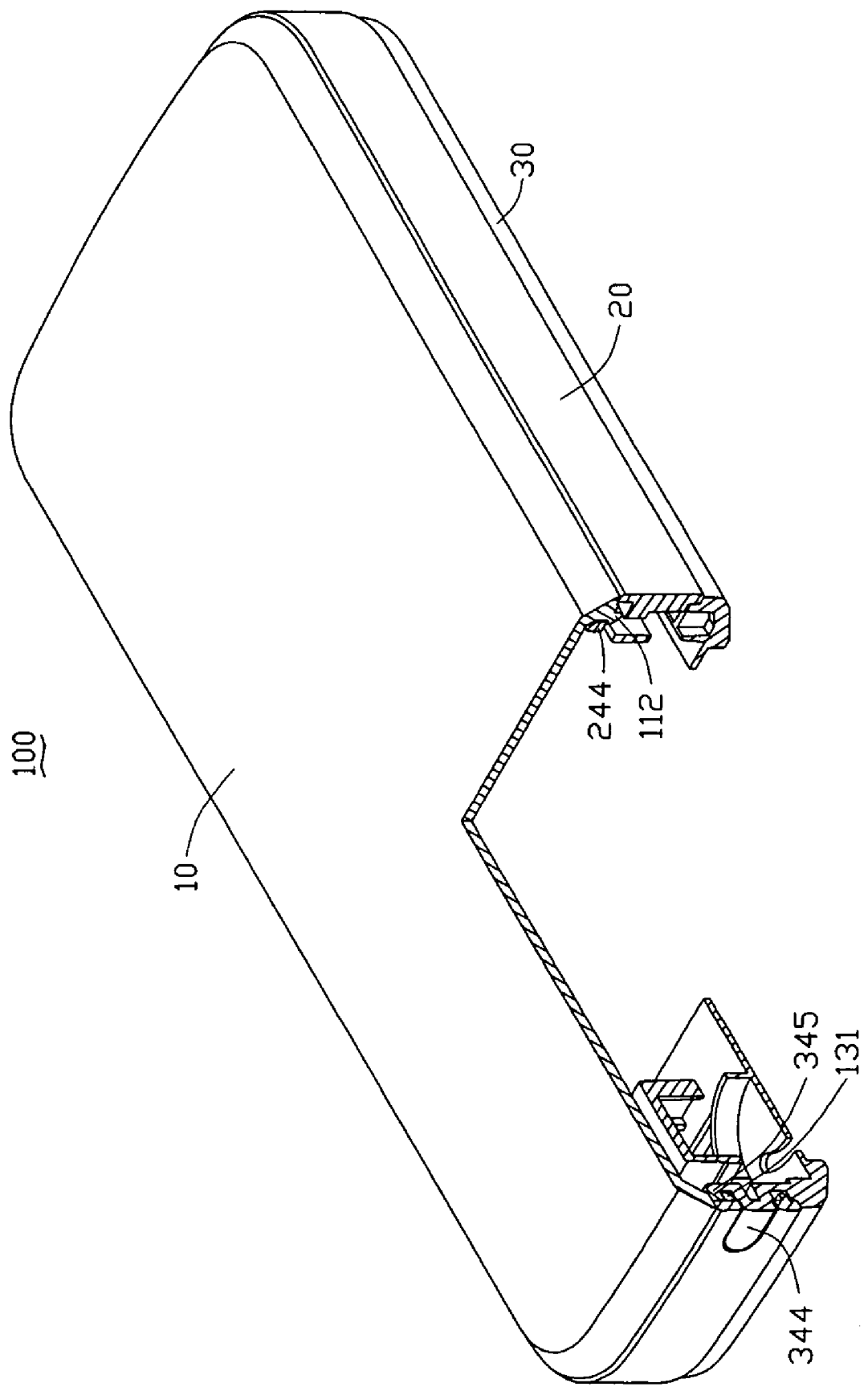
FIG. 4 is an enlarged, partial cross-sectional view of the battery cover latching assembly, within the mobile phone shown in FIG. 1.

Referring to FIG. 4, in assembly, first, the front cover 30 is aimed at the housing 20, and the clasp portions 341 of the front cover 30 are each engaged with their corresponding clasps 243 of the housing 20. At the same time, the latch 342 of the front cover 30 extends through the through hole 242 of the housing 20 along a first axis, with the button portion 344 of the latch 342 received in the button hole 221, and the hook 345 of the latch 342 abutting an edge of the end wall 22 of the housing 20. At this time, a surface of the button portion 344 is flat along an outer surface of the end wall 22. Second, the second claws 113 of the battery cover 10 are each engaged with their corresponding limiting portions 245 of the housing 20. The battery cover 10 is rotated toward the housing 20 via the limiting portions 245. Final, the first claws 112 of the battery cover 10 are each engaged with their corresponding claw portions 244 of the housing 20, and the hook 345 of the latch 342 is snappingly engaged with the locking portion 131 of the battery cover 10. Thus, the battery cover 10 is assembled with the housing 20 and the front cover 30 via the battery cover latching assembly 50.

When the battery cover 10 is to be detached from the housing 20, the user presses the button portion 344 of the latch 342, and the latch 342 deforms and becomes movable along a second axis perpendicular to the first axis. As a result, the hook 345 of the latch 342 is disengaged with the locking portion 131. Then, the battery cover 10 is rotated separately from the housing 20 via the limiting portions 245. The first claws 112 of the battery cover 10 are disengaged from the claw portions 244 of the housing 20, and the second claws 113 of the battery cover 10 are disengaged with the limiting portions 245 of the housing 20, thus, the battery cover 10 is detached from the housing 20.

In alternative embodiments, the front cover 30 could be attached to the housing 20 by another suitable method, for example by screws or pins. Also, the hook 345 of the latch 342 of the front cover 30 could be omitted, and the latch 342 could be engaged with the locking portion 131 by increasing a friction force therebetween.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A portable electronic device comprising:
   a housing having a through hole and a button hole defined therein, the button hole communicating with the through hole; the housing comprising two opposite sidewalls and two opposite end walls, the housing comprising a main partition wall, a plurality of claw portions being formed on the partition wall, adjacent to the sidewalls of the housing;
   a battery cover attached to a first side of the housing, the battery cover including a locking portion, a main body, two opposite long sides and two opposite short sides, a plurality of first claws being disposed on an inner surface of the main body; the claw portions formed on the partition wall each engage with their corresponding first claws of the battery cover, the plurality of first claws disposed on the inner surface of the main body, are adjacent to each long side, one end of each first claw is connected with the inner surface of the battery cover, and the other end of each first claw forms a hook thereat, a plurality of second claws are disposed on the inner surface of the main body, adjacent to one short side, one end of each second claw is connected with the inner surface of the battery cover, and the other end of each second claw forms a hook thereat, the locking portion is formed at the other short side;
   a front cover attached to an opposite second side of the housing, the front cover including a latch, the latch comprising:
   a body extending through the through hole along a first axis, and releasably engaging with the locking portion;
   a button portion integrally extending from the body, the button portion being received in the button hole, the button portion being movable along a second axis perpendicular to the first axis to disengage the locking portion from the body of the latch.

2. The portable electronic device as claimed in claim 1, wherein a plurality of limiting portions are formed on the partition wall, adjacent to one end wall, and the limiting portions each engage with their corresponding second claws of the battery cover.

3. The portable electronic device as claimed in claim 2, wherein the through hole is defined in the partition wall, adjacent to the other end wall of the housing, and the button hole is defined in the end wall separate from the limiting portions.

4. The portable electronic device as claimed in claim 2, wherein the through hole is defined in the partition wall, adjacent to the other end wall of the housing.

5. The portable electronic device as claimed in claim 1, wherein a plurality of clasps are disposed on the sidewalls of the housing, a plurality of clasp portions are formed in an inner surface of the front cover, and each clasp portion engages with its corresponding clasp of the housing.

6. The portable electronic device as claimed in claim 5, wherein the latch is disposed on the inner surface of the front cover, and the latch is made of elastic material.

7. The portable electronic device as claimed in claim 6, wherein one end of the body of the latch is connected with the inner surface of the front cover, a hook is formed at the other end of the body, and the hook is releasably engaged with the locking portion of the battery cover.

8. The portable electronic device as claimed in claim 1, wherein the shape of the button portion of the latch corresponds to the button hole of the housing.

9. A portable electronic device comprising:
a housing having a first housing side and an opposite second housing side, the housing has a through hole communicating the first housing side with the second housing side, the housing comprising two opposite sidewalls and two opposite end walls, the housing comprising a main partition wall, a plurality of claw portions being formed on the partition wall, adjacent to the sidewalls of the housing;
a first cover attached to the first housing side, the first cover comprising a first latch portion, a main body, two opposite long sides and two opposite short sides, a plurality of first claws disposed on an inner surface of the main body, the claw portions being formed on the partition wall each engage with their corresponding first claws of the first cover, the plurality of first claws disposed on the inner surface of the main body, are adjacent to each long side, one end of each first claw is connected with the inner surface of the first cover, and the other end of each first claw forms a hook thereat, a plurality of second claws are disposed on the inner surface of the main body, adjacent to one short side, one end of each second claw is connected with the inner surface of the first cover, and the other end of each second claw forms a hook thereat, the first latch portion is formed at the other short side;
a second cover attached to the second housing side, the second cover comprising a flexible second latch portion, and the second latch portion extending via the through hole from the second housing side to the first housing side, wherein upon moving the first cover relative toward the second cover, the second latch portion snappingly engages with the first latch portion so as to lock the first and second covers with each other, and wherein the first latch portion is disengagable from the second latch portion so as to release the first cover from the second cover by pressing the second latch portion away from the first latch portion.

10. The portable electronic device as claimed in claim 9, wherein the moving the first cover relative to the second cover is along a first axis, and the pressing the second latch is along a second axis, the first axis being perpendicular to the second axis.

11. The portable electronic device as claimed in claim 9, wherein the second latch portion integrally forms an operation portion thereon, and the housing has a button hole facing the operation portion and thus configured for exposing the operation portion to outside.

12. The portable electronic device as claimed in claim 9, wherein a plurality of limiting portions are formed on the partition wall, adjacent to one end wall, and the limiting portions each engage with their corresponding second claws of the first cover.

\* \* \* \* \*

UNITED STATES PATENT AND TRADEMARK OFFICE
CERTIFICATE OF CORRECTION

PATENT NO.         : 7,647,079 B2                                    Page 1 of 1
APPLICATION NO.    : 11/411653
DATED              : January 12, 2010
INVENTOR(S)        : Zuo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this

Sixteenth Day of November, 2010

David J. Kappos
*Director of the United States Patent and Trademark Office*